April 29, 1958

F. P. DAVIS 2,832,619

TRACTION UNIT

Filed Aug. 31, 1955

Frank P. Davis
INVENTOR

BY *C. A. Snow & Co.*
ATTORNEYS.

April 29, 1958   F. P. DAVIS   2,832,619
TRACTION UNIT
Filed Aug. 31, 1955   2 Sheets-Sheet 2

Frank P. Davis
INVENTOR
BY
ATTORNEYS.

United States Patent Office 2,832,619
Patented Apr. 29, 1958

2,832,619

TRACTION UNIT

Frank P. Davis, Alexandria, Va.

Application August 31, 1955, Serial No. 531,753

1 Claim. (Cl. 291—1)

This invention relates to a traction generating device.

An object of this invention is to provide a means for increasing or generating a traction of rubber tired wheels on a supporting surface such as a road, runway or the like.

Another object of this invention is to provide a traction unit for use on air craft, land vehicles or the like when increasing the traction of wheels when the latter are in contact with ice, snow or other slippery surfaces.

A further object of this invention is to provide a device of this kind which is simple in construction and can be attached to a vehicle or air craft for selective use when desired.

A further object of this invention is to provide a traction unit which is so constructed as to provide for the discharge of a liquid chemical or a granular chemical which is capable of increasing the traction of the air craft or vehicle on which the device is mounted.

With the foregoing and other objects in view which will appear as the description proceeds, the invention consists of certain novel details of construction and combination of parts, hereinafter more fully described and pointed out in the claim, it being understood that changes may be made in the construction and arrangement of parts without departing from the spirit of the invention as claimed.

Referring to the drawings.

Figure 1:
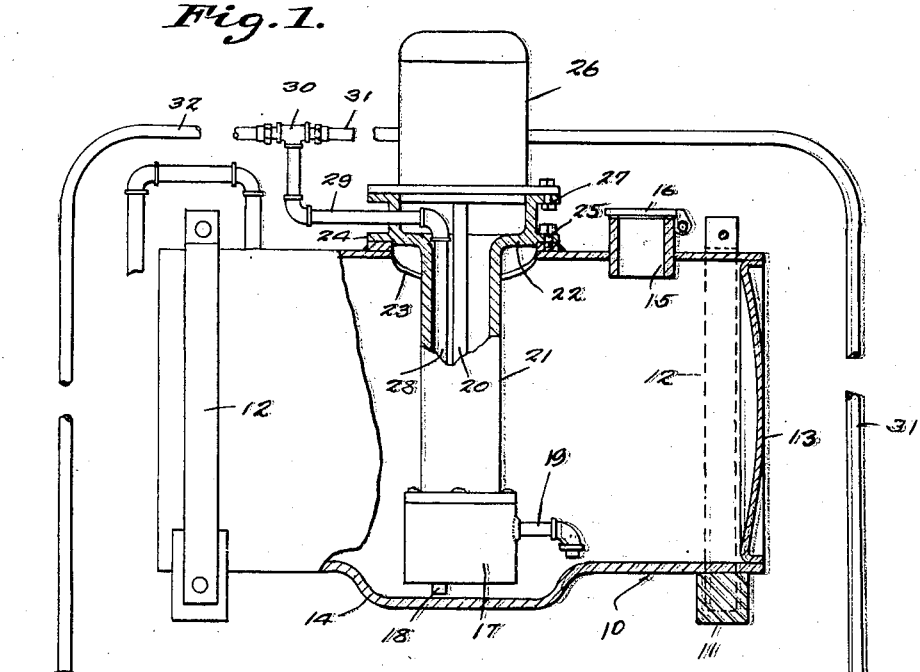
Figure 1 is a detail side elevation partly broken away and in section of a traction unit constructed to an embodiment of this invention.
Figure 2:
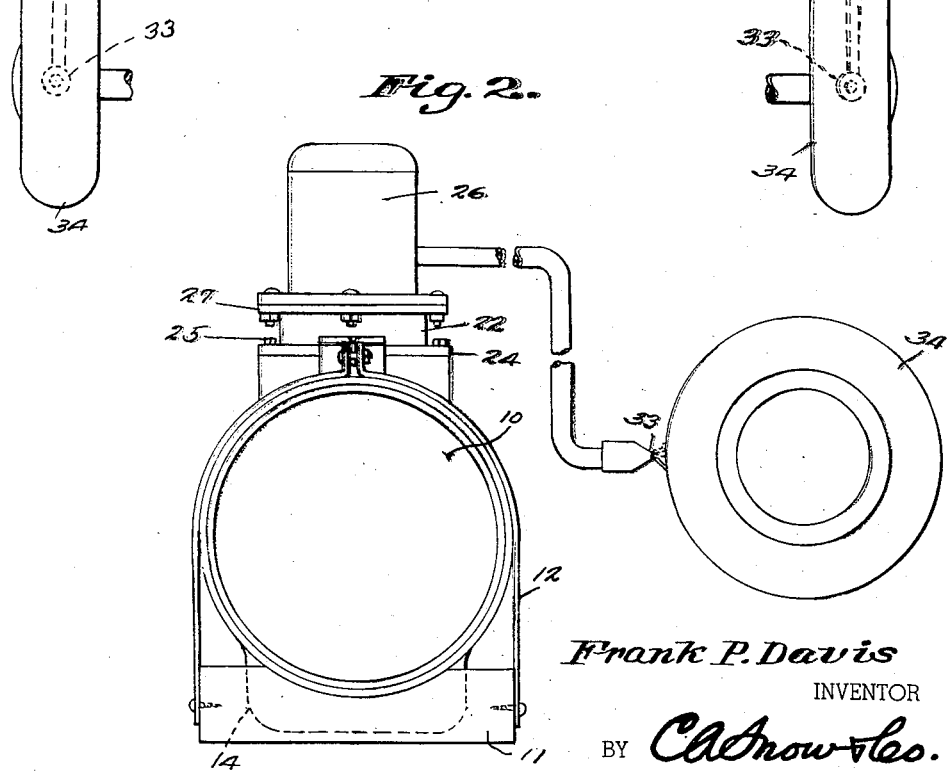
Fig. 2 is a detail end elevation of the device.

Referring to the drawings, and first to Figs. 1 and 2, the numeral 10 designates generally a cylindrical tank having end walls 13. The tank 10 has a pair of base members 11 secured thereto by means of a pair of clamping bands 12. The lower portion of the tank 10 is formed with a downwardly offset sump 14, the purpose for which will be hereinafter described. A chemical such as a liquid which is capable of increasing or generating a traction for rubber tired wheels, is adapted to be discharged into the tank 10 through a filler tank 15 having a spring-pressed closure or cap 16 mounted on the upper end thereof.

The tank 10 has mounted in the lower portion thereof a pump 17 which includes a section line 18 extending into the sump 14. The pump 17 also includes a by-pass pipe 19 whereby excessive fluid may be discharged back into the tank 10. A shaft 20 extends axially through a tubular housing 21 which is formed at its upper end with an enlarged housing portion 22. The housing 21 extends downwardly through an opening 23 formed in the upper portion of the tank 10 and the enlarged housing 22 includes a flange 24 secured by fastening means 25 to the tank 10 about the opening 23. An electric motor or other power element 26 is secured to a second or upper flange 27, carried by the enlarged housing 22, and the motor 26 is connected to the shaft 20. The outer or pressure side of the pump 17 has a pipe 28 connected thereto which extends upwardly through the housing 21. The pipe 28 includes an L-shaped extension 29 which is connected to a T 30. The opposite branches of the T 30 have liquid conducting pipes 31 and 32 extending therefrom and the pipes 31 and 32 are connected at their outer ends to nozzles 33. The nozzles 33 are disposed closely adjacent to wheels 34 which may be mounted on an air craft land vehicle.

Referring now to Figs. 3 to 6, inclusive, there is disclosed a modified form of this invention, which may be used for the discharge of a granular, powdered or other dry chemical or anti-friction means, to a point of engagement with the wheels of an air craft or land vehicle. A cylindrical tank 35 is provided with base members 36 secured to the tank 35 by means of clamping bands 37. The tank 35 has an annular downwardly projecting flange 38 extending therefrom in which an annular bushing 39 is secured. The bushing 39 includes a top wall 40 having an annular flange 41 about which the lower end of tubular housing 42 engages. A vertically disposed drive shaft 43 is beveled at its lower portion through the bushing or wall 40 and has the lower end thereof seated and rotatably mounted in a central bearing 44 formed in a bottom plate 45. The plate 45 is fixed to the bushing 39 by bolts or fastening means 46.

The lower end of the shaft 43 has fixed thereto a gear 47 which meshes with a driven gear 48 mounted on a conveyor shaft 49. The conveyor shaft 49 extends through a threaded bushing 50 which is mounted in the bushing 39. The conveyor shaft 49 has a screw conveyor 51 fixed thereon, and screw conveyor 51 extends through an upwardly and outwardly inclined conveyor housing 52. The conveyor housing 52 is open at its lower inner end and is fixed to a supporting member or bracket 53 which is positioned in the bottom portion of the tank 35. The shaft 43 is connected at its upper end to a motor or power member 54 which is secured by means of fastener members 55, to a ring or bushing 56 formed at the top of the housing 35. A dry chemical or traction means is adapted to be discharged into the tank 35 through a cylindrical filler neck 57 having a spring-pressed cap or closure 58 mounted on the upper end thereof. The upper outer end of the conveyor shaft 49 is operably mounted in a bushing or bearing 59 which is carried by a right-angularly disposed branch 60 which extends from the upper outer end of conveyor housing 52. The motor 54 includes an upwardly projecting shaft 61 which extends into a blower housing 62 having a pair of air outlets 63. A fan blade member 64 is mounted on the shaft 61 and is adapted to discharge air outwardly through the outlets 63 into a pair of outwardly projecting air conducting pipes 65. The valve housing 62 is formed with a central air intake opening 66 through which air is adapted to be drawn upon rotation of the fan blade member 64. The outer end of pipe 65 is connected to one branch 67 of a fitting 68, and fitting 68 includes a branch 69 which is connected to the conveyor housing branch 60. The air discharged through branch 67 is adapted to force the chemical or traction material from housing branch 60 downwardly through a mixing branch 70. The combined air and dry chemical are then discharged through a chemical conducting pipe 71 having a nozzle similar to nozzle 33, mounted on its terminal end. The end of pipe 71 is disposed in confronting position to a wheel of an air craft or land vehicle.

Figure 3:
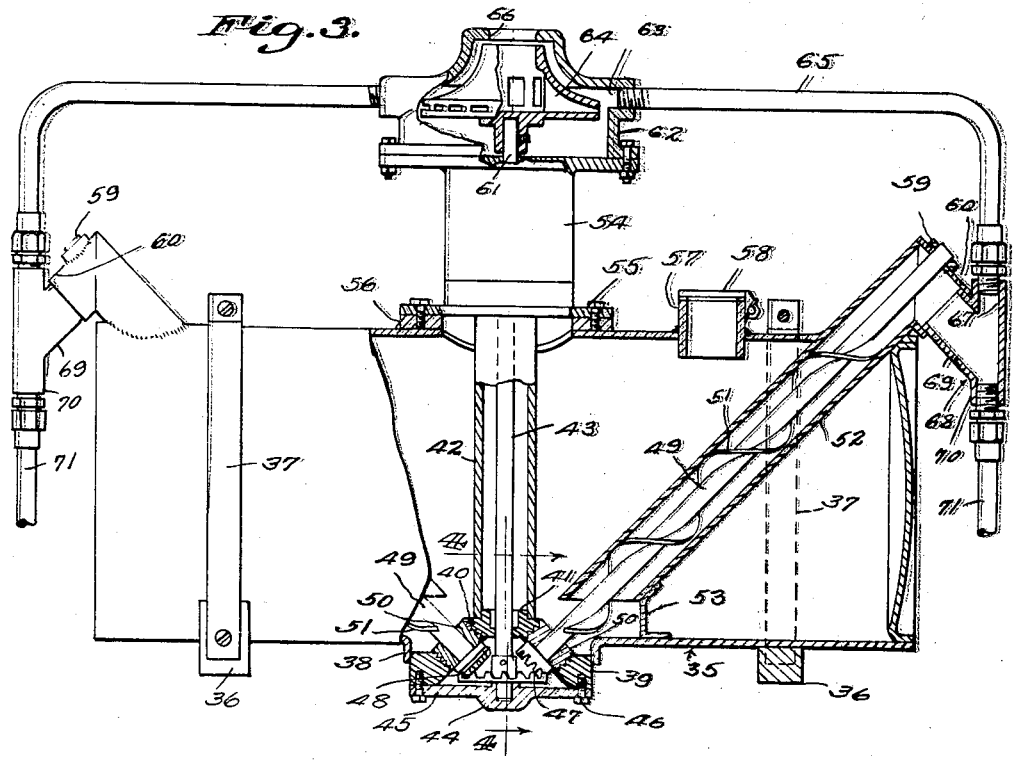
Fig. 3 is a fragmentary side elevation partly broken away and in section of a modified form of this invention.
Figure 4:
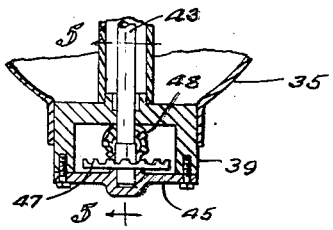
Fig. 4 is a fragmentary sectional view taken on line 4—4 of Fig. 3.
Figure 5:
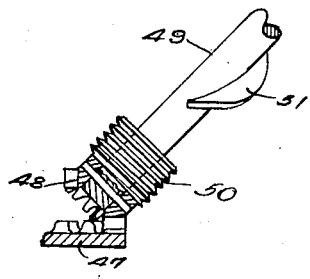
Fig. 5 is a fragmentary sectional view taken on line 5—5 of Fig. 4.
Figure 6:
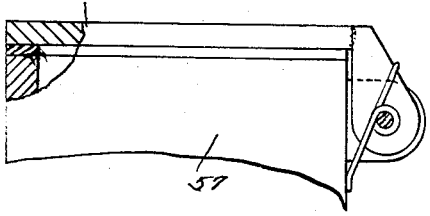
Fig. 6 is a fragmentary side elevation partly in section of the filler tank for the reservoir.

As shown in Fig. 3, there are two conveyors in tank 10 which extend upwardly and outwardly in opposite or divergent direction.

In the use and operation of this device the tank 10 is mounted on a land vehicle or air craft at any convenient location and the liquid conducting pipes 31 and 32 are extended from tank 10 to a point where the nozzles 33 will be in confronting position to the wheels. When it is necessary or desirable to provide for increase in the traction of the wheels 34, motor 26 is operated whereby the liquid traction chemical in tank 10 will be pumped through pipes 28, 29, 31 and 32 for discharge against the traction wheels. This liquid is preferably of a type which will generate a gummy or sticky surface on the wheel or tire so that the wheel or tire will have the traction thereof increased.

The device shown in Figs. 3 to 6, inclusive, will operate similar to that shown in Figs. 1 and 2, with the exception that the traction means will be in the form of a dry chemical, which may be powdered, granular or the like.

What is claimed is:

An anti-friction device for mounting on a wheeled aircraft or vehicle comprising a reservoir, a pair of pipe lines extending from opposite ends of said reservoir, a nozzle on the outer end of each pipe line in confronting position to a wheel, a pair of upwardly divergent conveyor housings in said reservoir, the upper end of each conveyor housing communicating with a pipe line, the lower end of each conveyor opening adjacent a central point in the bottom of said reservoir, a screw conveyor in each housing, a driven gear on the lower end of each conveyor, a vertical drive shaft housing extending through said conveyor, a drive shaft in said drive shaft housing, a bushing having an open bottom at the bottom of said housing, a closure plate for said open bottom, a drive gear in said bushing connected to said drive shaft and meshing with said driven gears, a motor connected to said drive shaft, mounted on the top of said reservoir, a second drive shaft connected to said motor, a blower housing mounted on said motor, said second drive shaft extending into said blower housing, a blower in said blower housing connected to said second drive shaft, and a second pair of pipe lines extending from said blower housing, each connected to one of said first mentioned pairs of pipe lines at a point adjacent its connection to an associated conveyor housing.

References Cited in the file of this patent

UNITED STATES PATENTS

| | | |
|---|---|---|
| 708,929 | Simmons et al. | Sept. 9, 1902 |
| 710,072 | Potter | Sept. 30, 1902 |
| 1,491,199 | Chapman | Apr. 22, 1924 |
| 2,033,322 | Boyer et al. | Mar. 10, 1936 |
| 2,243,450 | Aikman | May 27, 1941 |
| 2,727,770 | Davis | Dec. 20, 1955 |